(12) United States Patent
Brennen et al.

(10) Patent No.: US 8,974,916 B2
(45) Date of Patent: Mar. 10, 2015

(54) DEVICES OBTAINED BY SOLID STATE BONDING METHOD

(75) Inventors: Reid Brennen, San Francisco, CA (US);
Kevin Killeen, Woodside, CA (US);
Karen L. Seaward, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 829 days.

(21) Appl. No.: 12/642,813

(22) Filed: Dec. 20, 2009

(65) Prior Publication Data

US 2011/0151272 A1    Jun. 23, 2011

(51) Int. Cl.
| | |
|---|---|
| B32B 15/01 | (2006.01) |
| B32B 15/04 | (2006.01) |
| B32B 15/18 | (2006.01) |
| B32B 3/20 | (2006.01) |
| C23C 30/00 | (2006.01) |
| B01D 63/08 | (2006.01) |
| B23K 20/02 | (2006.01) |

(52) U.S. Cl.
CPC ............... *B32B 15/01* (2013.01); *C23C 30/005* (2013.01); *B32B 15/043* (2013.01); *B01D 63/088* (2013.01); *B32B 3/20* (2013.01); *B32B 15/18* (2013.01); *B23K 20/023* (2013.01)
USPC ........... 428/627; 428/685; 428/683; 428/687; 428/596; 428/660

(58) Field of Classification Search
CPC ........ B32B 3/20; B32B 15/01; B32B 15/043; B32B 15/18; B32B 2255/062; C23C 30/00; C23C 30/005
USPC ......... 428/615, 627, 628, 685, 682, 683, 684, 428/687, 596, 597, 600, 601, 613, 660
See application file for complete search history.

(56) References Cited

U.S. PATENT DOCUMENTS

| | | | |
|---|---|---|---|
| 5,350,637 A * | 9/1994 | Ketcham et al. ............ | 428/539.5 |
| 5,799,859 A * | 9/1998 | Cheng ............................ | 228/157 |
| 6,196,936 B1 * | 3/2001 | Meckel ......................... | 473/349 |
| 6,656,603 B2 * | 12/2003 | Buldhaupt et al. ............. | 428/593 |
| 2004/0119038 A1 * | 6/2004 | Crockett et al. .............. | 251/63.5 |
| 2007/0275263 A1 * | 11/2007 | Groll .............................. | 428/653 |
| 2008/0142479 A1 * | 6/2008 | Beerling et al. ................ | 216/58 |

* cited by examiner

*Primary Examiner* — Michael E La Villa

(57) ABSTRACT

A method for solid state bonding of a plurality of metallic layers and devices made by that method are disclosed. First and second metallic layers are solid state bonded utilizing a protective coating on the non-bonded surfaces that engage the pressure applying appliance to prevent the surfaces from adhering to the pressure applying appliance and to protect the surfaces from imprinting during the bonding process. The invention can be used to fabricate micro-channel devices with smooth outer surfaces and eliminate mold release compounds utilized in conventional bonding procedures.

5 Claims, 4 Drawing Sheets

DEVICES OBTAINED BY SOLID STATE BONDING METHOD

BACKGROUND OF THE INVENTION

Small flow channels for liquids and gases are often required in micro-fluidic devices. These channels are too small to be created by conventional machining, and hence, techniques based on the bonding of multiple layers of metals have been developed. The layers of metal can be machined to provide channels, which, when bonded to each other form closed channels through which fluids can be moved.

Laminated multi-layer metal devices can be constructed by bonding metal layers using solid state bonding (e.g. diffusion bonding and thermal compression bonding), adhesive bonding, ultrasonic welding, etc. but the preferred method is diffusion bonding because the resulting device is a single monolithic block of material with internal features. This device, therefore, is much stronger than a device made by using, for example, adhesive bonding.

The lamination of multiple layers during the diffusion bonding process occurs in a low inert gas pressure or vacuum environment, at high metal layer temperatures, and using an applied force to create a substantial bonding pressure between the layers. Prior to the start of the process, the layers of material are stacked upon each other and pressure is provided by platens on the top and bottom of the stacked layers. The bonding must be done in a manner that prevents the layer from bonding or otherwise adhering to these lamination platens.

Currently, there are two prior art methods for preventing this undesirable adherence. First, the bonding layers may be fabricated from a material that does not adhere to the platen material at high temperatures. This method limits the types of materials that can be bonded, and hence, presents problems in some material systems.

The second method involves using a release agent between the platens and the outer surface of the layers. This release agent may be in the form of a fine powder or a sheet of separator material, or both. The release agent is chosen such that it does not adhere to either the platen or the layer materials at high temperatures under bonding pressure. For the bonding of some materials, it is difficult or expensive or not possible to make a separator sheet that is effective in preventing bonding where it is not wanted. In addition, for some materials, the use of separator sheets or release agents (which are often in the form of powders) leaves an imprint of the separator sheet surface or powder on the material surface, thereby degrading the surface finish.

SUMMARY OF THE INVENTION

The present invention includes a method for diffusion bonding a plurality of metallic layers and devices made by that method, particularly, micro channel devices. In the method of the present invention, first and second metallic layers, each layer having top and bottom opposing surfaces, are provided. The bottom surface of the first layer is adjacent to the top surface of the second layer. The first and second layers are placed between first and second platens, respectively; the top surface of the first layer is adjacent to the first platen. A coating of a first protective material is bonded either to the surface of the first platen that is adjacent to the top surface of the first layer or to the top surface of the first layer. A pressure is applied to the first and second layers via the first and second platens while heating the first and second layers to a temperature at which the first and second layers undergo diffusion bonding between the bottom surface of the first layer and the top surface of the second layer. The first protective material prevents the top surface of the first layer from adhering to the first platen at the pressure and temperature utilized in the bonding process.

In one aspect of the invention, the coating of first protective material is bonded to the first platen. In another aspect of the invention, the coating of first protective material is bonded to the top surface of the first layer. The first and second layers include stainless steel or titanium in another aspect of the invention. The first protective material can include, for example, TiN, TiCN, AlTiN, CrN/CrC, TiAln/MoS$_2$, and/or TiAlN.

In another aspect of the invention, third and fourth metallic layers having top and bottom opposing surfaces are provided. The bottom surface of the third layer is adjacent to the top surface of the fourth layer. A separator that includes a layer of a separator material having top and bottom separator surfaces is provided. The top and bottom separator surfaces include a coating of a second protective material, the second protective material preventing the separator material from adhering to the top surface of the third layer at the temperature and pressure. The separator is placed adjacent to the bottom surface of the second layer. The third and fourth layers are placed between the separator and the second platen such that the second and third layers undergo solid state bonding between the bottom surface of the third layer and the top surface of the fourth layer when the third and fourth layers are heated to the temperature and subjected to the pressure. The second protective material prevents the separator from adhering to the top surface of the third layer during the solid state bonding. In one aspect of the invention, the separator includes a layer of alumina and the second protective layer includes TiAlN, TiN, CrN/CrC, or AlTiN/MoS$_2$.

A device according to the present invention includes a first layer of metal having a substantially opposing top surface and a bottom surface, the top surface having a protective coating applied thereto, the protective coating includes a protective material that prevents the top surface of the first layer from adhering to the platen or separator at temperatures greater than 500° C. and pressures greater than 20 psi and a second layer of the metal, the second layer having a top surface that is bonded to the bottom surface of the first layer by a solid state bond. In one aspect of the invention, the second layer has a bottom surface that substantially opposes the top surface of the second layer and the device includes a third layer, the third layer having a top surface that is bonded to the bottom surface of the second layer by a solid state bond and a bottom surface having a protective coating that includes the protective material. In yet another aspect of the invention, the first layer and/or the second layer are patterned such that the device includes a fluid passage therethrough.

DETAILED DESCRIPTION OF THE PREFERRED EMBODIMENTS OF THE INVENTION

Figure 1A:
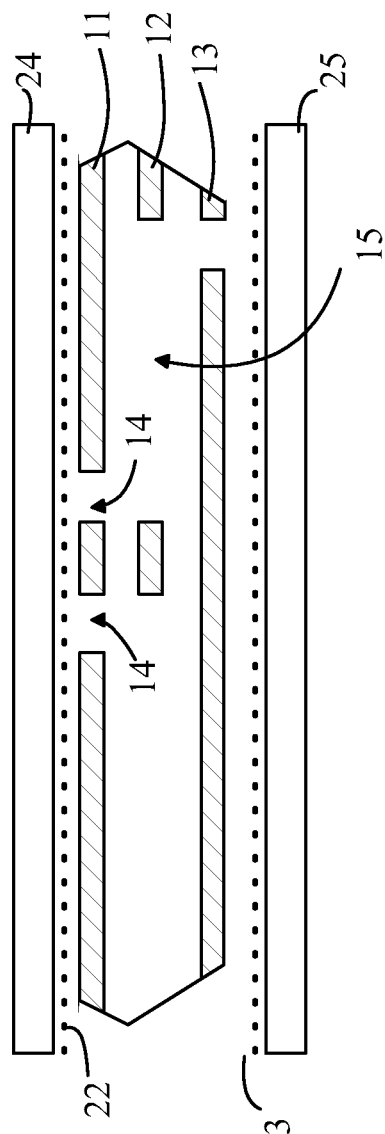
FIGS. 1A and 1B illustrate the manner in which a prior art device with a micro channel for fluid flow is constructed.
Figure 1B:
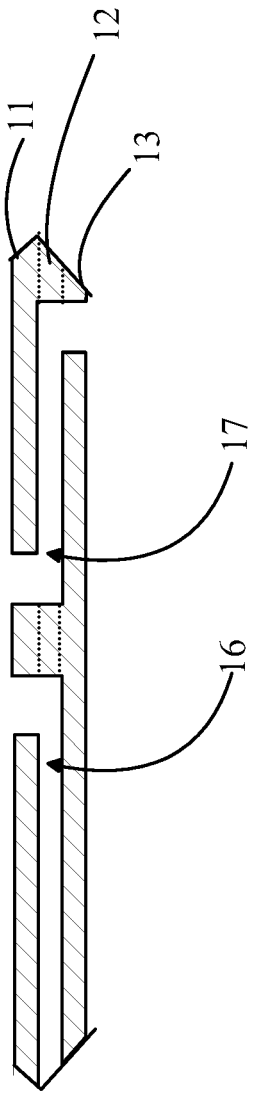

The manner in which the present invention provides its advantages can be more easily understood with reference to FIGS. 1A and 1B, which illustrate the manner in which a prior art device with a micro channel for fluid flow is constructed. Referring to FIG. 1A, three metallic layers 11, 12, and 13 are patterned to provide openings such as those shown at 14 and 15 that will form the desired channel when the layers are bonded together. The layers are typically placed between two platens 24 and 25 that apply pressure forcing the layers together while the material is heated to a suitable temperature that will lead to compression bonding of the metal layers. To prevent the metal layers from adhering to the platens, layers of a release agent such as those shown at 22 and 23 are placed between the platens and the metal layers.

After the layers are bonded as shown in FIG. 1B, the individual layers effectively become a monolithic device with the channels shown at 16 and 17 formed therein. As noted above, without the release agent, the outside metal layers can stick to the platen and be damaged when the platen is separated from the layers. With the release agent, the surface finish of the outer layers can be altered due to the imprint of the release agent that is typically a powder. In addition, for very high temperature bonding, finding a suitable release agent with acceptable properties and cost often presents significant challenges.

Figure 2:
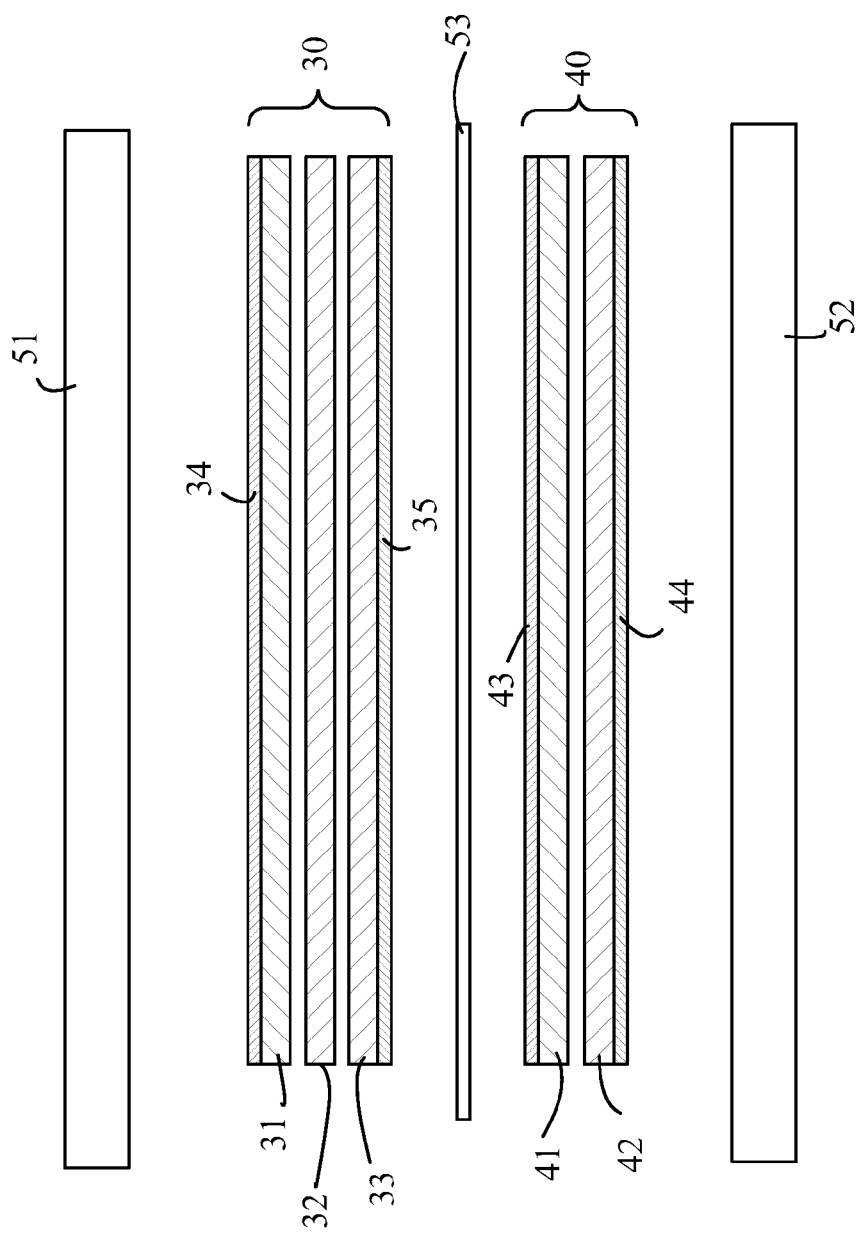
FIG. 2 is a cross-sectional view of a bonding arrangement in which two devices are created simultaneously by bonding various layers of metal.

The present invention utilizes coatings that can be applied to a surface between the surface being bonded and the surface applying the bonding pressure. For example, the coating can be applied to the outer surface of the outermost metal layer that comes in contact with the platen in the bonding apparatus. Refer now to FIG. 2, which is a cross-sectional view of a bonding arrangement in which two devices are created simultaneously by bonding various layers of metal. Device 30 is constructed by bonding the three metal layers shown at 31-33. Device 40 is constructed by bonding the two metal layers shown at 41 and 42. The bonding operations are carried out simultaneously by applying pressure to the stack of layers via platens 51 and 52. A separator sheet 53 is utilized to separate the devices during the bonding process. Alternatively, if the coatings on the outer surfaces of the outer layers do not stick to each other during the bonding process, the separator can be omitted. The surfaces of layers 31 and 33 that are not being bonded together are coated with a layer of material as shown at 34 and 35. This coating is bonded to the surfaces in question and does not stick or bond to the material from which platen 51 is constructed. The material also does not stick or bond to the material from which the optional separator sheet 53 is constructed. Similarly, the outer surfaces of layers 41 and 42 are coated with the protective layer of material as shown at 43 and 44. Hence, when the stack of layers is bonded by applying pressure via platens 51 and 52 while heating the layers, a mold release agent is not needed and the surfaces of the final devices will not be imprinted with a powder pattern as described above with respect to the prior art bonding procedures.

Figure 3:
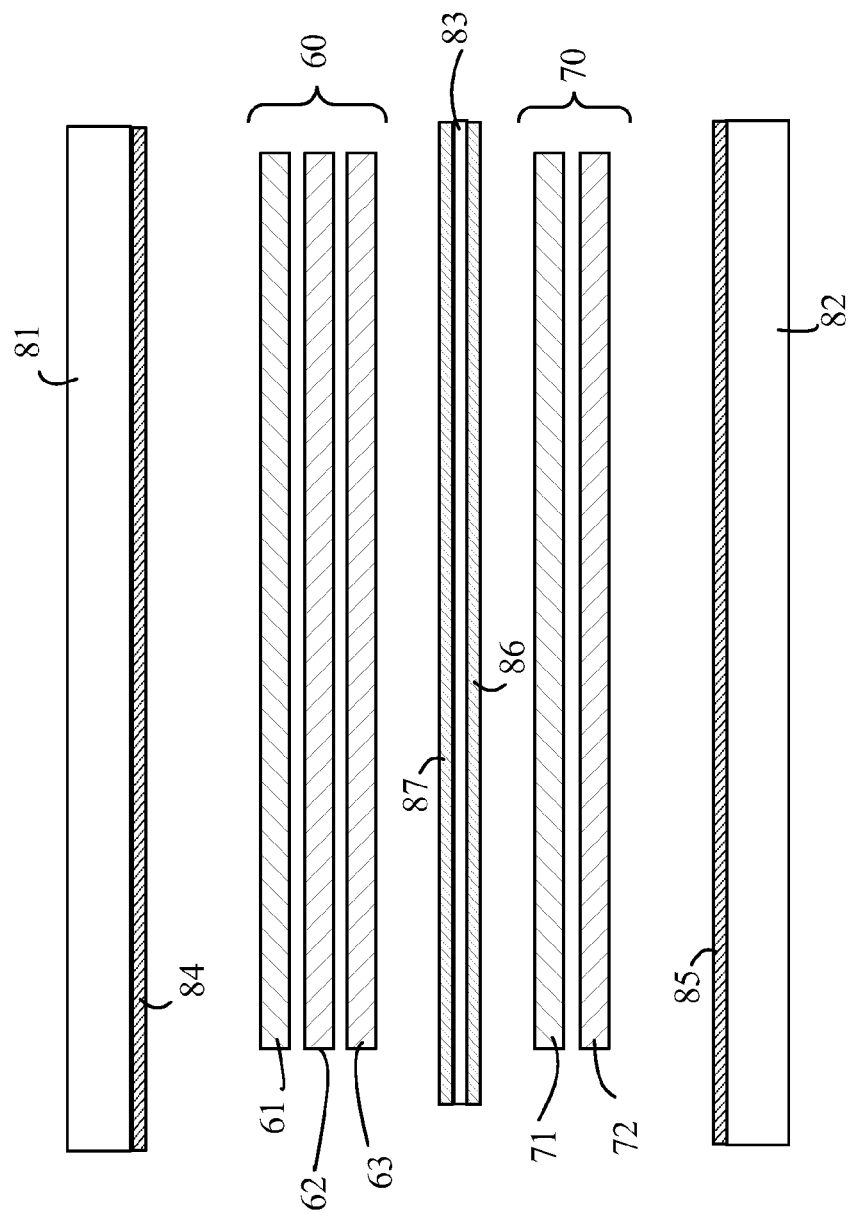
FIG. 3 is a cross-sectional view of a bonding arrangement in which two devices are bonded utilizing an arrangement in which the protective coatings are applied to the platen and separator sheet.

Alternatively, the coating could be applied to the platen and separators rather than to the surfaces of the layers being bonded. Refer now to FIG. 3, which is a cross-sectional view of a bonding arrangement in which the two devices discussed above are bonded utilizing an arrangement in which the protective coatings are applied to the platen and separator sheet. Device 60 is bonded from layers 61-63 that are constructed in the conventional manner. Similarly, device 70 is constructed by bonding conventional layers 71 and 72. Platens 81 and 82 include protective coatings 84 and 85, respectively. These coatings provide the same benefits as those described above with respect to FIG. 2. Separator 83 also includes protective coatings 86 and 87. Since layers 63 and 71 do not have protective coatings on their outer surfaces, separator 83 is no longer optional. Since this embodiment of the present invention can be used for bonding a plurality of different metal layers, the protective coatings must be capable of providing the desired protection at the highest temperatures and pressures associated with the different types of metal layers. In the embodiment shown in FIG. 2, the protective coatings can be tailored to the types of metals being bonded.

In general, the protective coatings must be inert with respect to the layers being bonded and the platens or separator sheets at the temperatures encountered during the bonding process. In addition, the coatings must be stable at the bonding temperatures and pressures. For example, coatings for devices for use in diffusion bonding of stainless steel must withstand temperatures over 900° C. and pressures over 100 psi. In contrast, coatings for use in diffusion bonding of titanium need only withstand temperatures over 650° C. and pressures over 100 psi.

Suitable coatings for stainless steel and titanium include AlTiN, TiAln/$MoS_2$, and/or TiAlN. In addition, other coatings may be deposited to prevent sticking and to harden the surface. For embodiments in which an alumina separator is utilized between devices, suitable coatings for preventing the separator from sticking to the titanium include AlTiN, TiN, CrN/CrC, and TiAln/$MoS_2$. All coatings are preferably applied such that the deposited coating is smooth.

While the above-described embodiments utilize devices constructed from stainless steel or titanium, the coatings of the present invention could be utilized in the solid state bonding of other materials such as Ti—Al alloys, tungsten, copper, aluminum, gold, and silver. The specific materials depend on the application for which the resultant device is intended.

Figure 4:
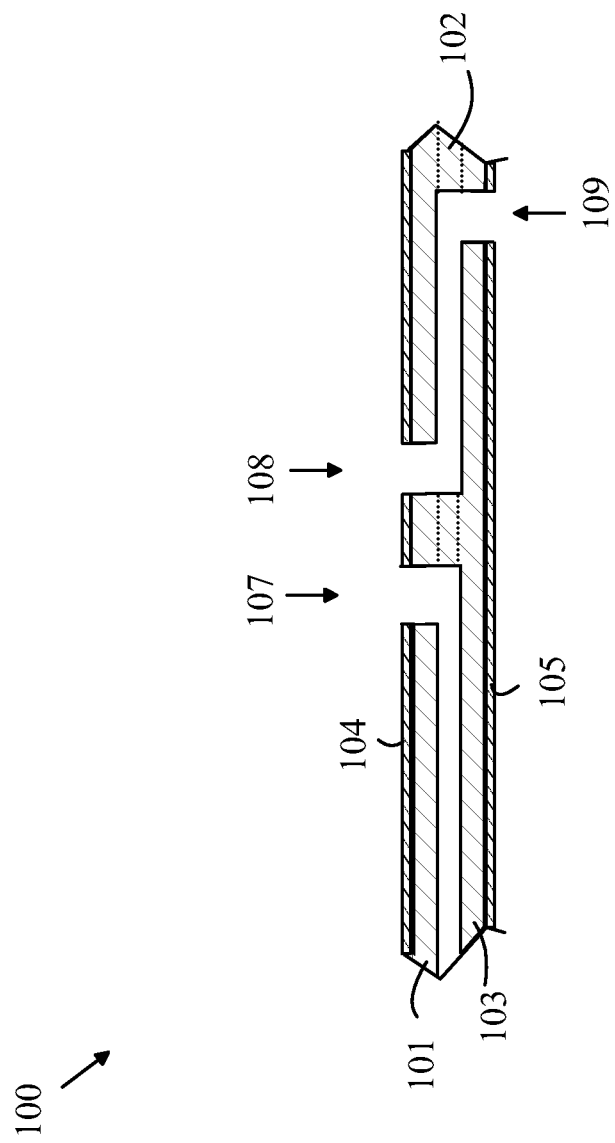
FIG. 4 is a cross-sectional view of a portion of a microchannel device according to one embodiment of the present invention.

As noted above, one problem with prior art anti-sticking schemes is the imprint of the mold release powders on the outer surfaces of the device being fabricated. Refer now to FIG. 4, which is a cross-sectional view of a portion of a micro-channel device according to one embodiment of the present invention. Device 100 is constructed by solid state bonding of layers 101-103 in a manner analogous to that described above. The top surface of layer 101 and the bottom surface of layer 103 are coated with protective coatings 104 and 105, respectively. As noted above, these coatings prevent the underlying surfaces from sticking to the platen or other devices during the solid state bonding process. The regions around the openings shown at 107-109 are sealed to fluid containing valves or channels in the final structure that utilizes device 100. Accordingly, it is advantageous to provide a smooth surface in these regions to prevent leaks. Typically, the underlying metal layers have surface finishes that are sufficiently smooth. Hence, to accomplish this goal, the coating process used to apply layers 104 and 105 must provide a finished surface with the desired degree of smoothness. In addition, any imprinting caused by the platen or other structure that presses on coatings 104 and 105 must be less than that needed to provide the seal in question. In practice, the surface of the final device should not vary by more than 1-5 micrometers after the solid-state bonding is completed.

The coatings of the present invention can be applied to the surfaces in question utilizing physical vapor deposition, chemical vapor deposition, or other processes. These coatings are commonly utilized in machine tools to protect the tool from wear.

The embodiments of the present invention described above utilize planar sheets of material for the layers. However, solid-state bonding can be carried out on non-planar layers provided a mechanism that applies force between the non-planar layers is utilized. For example, two curved layers could be bonded using platens that have a matching curvature or an adapter that matches the curvature on one side of the adapter and the planar surface of the platen on the other side.

The terms top and bottom as used herein are merely labels to conveniently distinguish between opposing surfaces of a layer. These terms do not imply any restriction with respect to orientation with respect to the Earth or any structure that is exterior to the layers.

It should be noted that this invention is not limited to the diffusion bonding process but may include any bonding process where the combination of temperature and pressure on the exterior surfaces of the layer stack may result in the adherence of such exterior surfaces to the platens or separators which press against those surfaces. The most common processes for this invention would be solid state bonding which includes thermal compression bonding and diffusion bonding but may also include other methods. Further, each layer in the bonding process may have more than one material. For example, a ceramic substrate may have a metal deposited on it such that it can be bonded to another layer using a solid-state bonding method such as thermal compression bonding (U.S. Pat. No. 5,009,357). Ceramics may also be bonded directly to metal (U.S. Pat. No. 4,355,463).

For the purposes of the present patent, the term solid state bond is defined to be any bond between two metal surfaces that does not rely on a third adhesive material. As noted above, thermal compression bonding and diffusion bonding are examples of solid state bonding.

It should be noted that the number of adjacent metallic layers to be bonded need not be limited to two. For example, three or more layers may be used.

In the above-described embodiments, the platens and separators are defined as separate components. The separators can be placed between the platens and metallic layers as well as between groups of layers. The platens may be made out of any metallic or ceramic material that can distribute a preferably even pressure over the separators and metallic layers at high temperatures.

While the above-described embodiments refer to the bonding of metal layers, it should be understood that each layer may not be a single material. For example, a piece of ceramic may have metal deposited on it such that that metal-coated ceramic layer can be bonded to other layers.

The protective coating of the present invention on a device serves several beneficial purposes. First, the coating prevents adherence of the device to the platens and/or separators during bonding of the layers that make up the device. Second, the protective coating may act as a hard physical shield for the device surface during use. For example, the device may be used in an environment in which an adjacent component of a system rubs or slides on the device surface. The hard coating provides a longer wearing, damage-reducing interface surface in such environments. Third, the coating may provide a reduced friction surface in cases where other components rub or slide on the device surface. For example, the $TiAlN/MoS_2$ coating embodiment provides a solid lubricant, the $MoS_2$, as the contact surface. Fourth, the coatings can protect the metal device surface from corrosion during use. Fifth, the platen and/or separator coated with the protective material may be reusable.

The summary of the invention and above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. A device comprising:
   a first layer of a metal, said first layer having substantially opposing top and bottom surfaces, said top surface having a protective coating bonded thereto, said protective coating comprising a protective material that prevents said top surface of said first layer from adhering to a metallic or ceramic layer at temperatures greater than 500° C. and pressures greater than 10 psi; and
   a second layer of said metal, said second layer having a top surface that is bonded to said bottom surface of said first layer by a solid state bond between said metal in said first layer and said metal in said second layer,
   wherein said second layer has a bottom surface that substantially opposes said top surface of said second layer, wherein said device further comprises a third layer, said third layer having a top surface that is bonded to said bottom surface of said second layer by a solid state bond and a bottom surface having a protective coating comprising said protective material, and
   wherein said first layer and/or said second layer are patterned such that said device includes a fluid passage therethrough, said fluid passage being configured to pass fluid entering said device through a first opening in said device and exiting said device through a separate second orifice in said device.

2. The device of claim 1 wherein said metal comprises titanium or stainless steel.

3. The device of claim 1 wherein said protective material comprises TiN, TiCN, AlTiN, CrN/CrC, $AlTiN/MoS_2$, and/or TiAlN.

4. A device comprising:
   a first layer of a metal, said first layer having substantially opposing top and bottom surfaces, said top surface having a protective coating bonded thereto, said protective coating comprising a protective material that prevents said top surface of said first layer from adhering to a metallic or ceramic layer at temperatures greater than 500° C. and pressures greater than 10 psi; and
   a second layer of said metal, said second layer having a top surface that is bonded to said bottom surface of said first layer by a solid state bond, wherein said first layer and/or said second layer are patterned such that said device includes a fluid passage therethrough,
   wherein said protective coating has top and bottom opposing surfaces, said bottom surface being bonded to said top surface of said first layer, said top surface of said protective layer having a planar surface surrounding an opening of said fluid passage, said planar surface not varying by more than 5 microns.

5. The device of claim 4 wherein said planar surface does not vary by more than 1 micron.

* * * * *